United States Patent

Vetter

[15] 3,675,184
[45] July 4, 1972

[54] COMBINED CABLE CLAMP AND SEAL FOR A BACKSHELL

[72] Inventor: Ottomar H. Vetter, Minneapolis, Minn.
[73] Assignee: United-Carr, Incorporated, Boston, Mass.
[22] Filed: Oct. 17, 1969
[21] Appl. No.: 867,183

[52] U.S. Cl. .................................................339/103 B
[51] Int. Cl. ..............................................H01r 13/58
[58] Field of Search ............... 277/206, 207 A; 339/103 T, 339/177, 94, 95 D, 89

[56] References Cited

UNITED STATES PATENTS

| 794,499 | 7/1905 | Hageman | 277/206 X |
| 1,450,126 | 3/1923 | Wilson | 277/206 X |
| 2,656,200 | 10/1953 | Galliers | 285/348 X |
| 3,413,407 | 11/1968 | Potter | 339/177 X |
| 3,465,092 | 9/1969 | Schwartz | 339/103 X |
| 3,501,737 | 3/1970 | Harris et al. | 339/177 |

*Primary Examiner*—Richard E. Moore
*Attorney*—Dugger, Peterson, Johnson & Westman

[57] ABSTRACT

A specially grooved elastomeric ring member provides both the requisite anchoring of the cable at one end of a backshell and an effective sealing in the region where the cable enters the backshell.

10 Claims, 2 Drawing Figures

Patented July 4, 1972  3,675,184
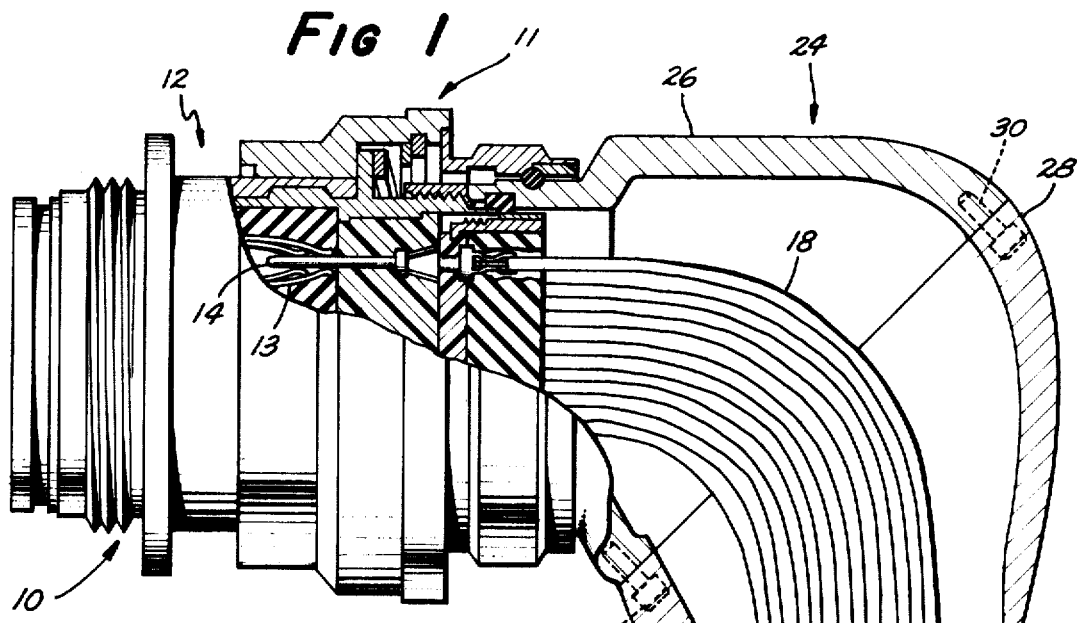
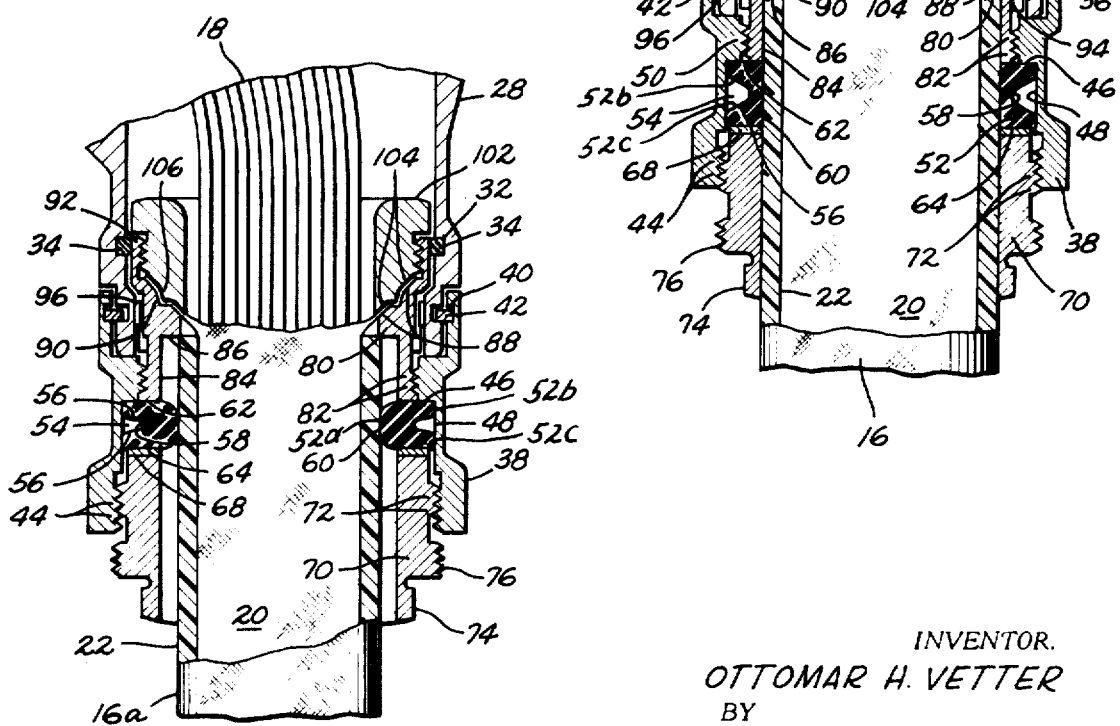
INVENTOR.
OTTOMAR H. VETTER
BY
Dugger, Peterson, Johnson & Westman
ATTORNEYS

3,675,184

COMBINED CABLE CLAMP AND SEAL FOR A BACKSHELL

BACKGROUND OF THE INVENTION

1. Field of the Invention

This invention relates generally to electrical connectors, and pertains more particularly to a cable clamp and seal for a connector having a detachable backshell associated therewith.

2. Description of the Prior Art

Backshells in the past have had sealing and cable clamping arrangements. However, the particular sealing arrangements with which I am familiar do not provide for accommodating cables of different sizes with the needed degree of clamping. Hence, the user is compelled to use one size of cable for a given backshell and where the cable size may differ or vary to any extent, then the cable is not adequately clamped or gripped and frequently the effectiveness of the sealing action is reduced at the same time. This can be particularly troublesome in environments demanding a high degree of reliability, such as in aerospace operations, where deleteriousness cannot be tolerated.

SUMMARY OF THE INVENTION

Accordingly, one object of the invention is to provide a resilient seal for a backshell that will also effectively anchor the cable. More specifically, the inventor has for an aim the clamping of the cable so that it will not become inadvertently detached nor will it allow any undue load or pull to be applied to the ends of the individual conductors that extend through the backshell into engagement with the various contacts of the electrical connector to which the backshell is attached. It will be appreciated that in certain applications, it is mandatory that the cable be securely anchored and at the same time protection be provided from the seepage of moisture or contaminant-laden gas into the backshell.

Another object of the invention is to provide a combined cable anchoring and sealing arrangement that lends itself readily to miniaturization. In this regard, the resilient seal that also applies the requisite gripping action to the cable can be made quite small since its configuration enables it to be placed in a void of minuscule proportions where the forceful distortion thereof performs not only the sealing but the anchoring of the cable.

A further object of the invention is to provide a multiple sealing action which is of advantage where there are plural routes or avenues via which the seepage of moisture or the entrance of gas into the backshell can occur. For instance, one seepage path can exist along the cable itself and a second along screw threads to either side of the sealing ring. The distortion of the sealing ring configured in accordance with the teachings of the present invention blocks such routes.

A still further object of the invention is to provide a structure for basically furnishing a good sealing action and effecting the desired clamping of the cable but in addition furnishing a good grounding path from the braid or woven sheath of metal encircling the cable to the backshell.

Yet another object of the invention is to provide a combined cable clamping and sealing system for backshells that does not require special implements or tools when effecting the clamping and sealing action.

Still further, another object of the invention is to provide a backshell seal that will withstand a considerable amount of torque that might be applied to the cable with respect to the backshell, thereby clamping the cable not only with respect to any tensional pull, but also resisting any twisting of the cable with respect to the backshell.

Briefly stated, the present invention contemplates the utilization of a resilient ring of elastomeric material having a circumferential groove extending therearound which forms sections of resilient material that can be distorted in such a manner that the resilient ring securely grips the cable for the purpose of anchoring same and concomitantly therewith furnishes the desired requisite action.

BRIEF DESCRIPTION OF THE DRAWING

FIG. 1 is a side elevational view, partly in section, illustrating a mated electrical connector and a backshell attached thereto, the backshell having structure associated therewith which illustrates my invention when clamping a cable of one particular size, and FIG. 2 is a fragmentary sectional view showing a cable of smaller size being clamped by the same size resilient ring pictured in FIG. 1.

DESCRIPTION OF THE PREFERRED EMBODIMENT

First and second connector units 10 and 11 are designed to be detachably mated with each other and collectively constitute the electrical connector labeled 12. The connector unit 10 is shown with one socket contact 13, whereas the unit 11 is shown with one pin contact 14 received therein. A conventional cable has been designated by the reference numeral 16 in FIG. 1, the cable containing any desired number of individual conductors 18 covered by a cylindrical layer of dielectric material (not shown), usually polyethylene or Teflon. Each conductor 18 is connected to a contact 14. Exteriorly of the cylindrical layer of polyethylene or Teflon is a cylindrical metallic braid or woven shield 20 which is in turn covered by an outer casing or jacket 22 of weather-resistant material such as a polyvinyl. It will be recognized that the particular design of the cable is not especially important to the present invention. It should be understood, though, that the invention does enable the clamping of cables varying in diameter, thereby rendering the backshell when equipped with structure in accordance with the present invention more suitable and valuable for a variety of purposes where reliability is important. Comparison of FIGS. 1 and 2 will illustrate to some extent the utility in this respect, for in FIG. 2 a cable 16a of smaller diameter appears, the suffix a having been added to distinguish the smaller size cable from the larger one labeled 16 in FIG. 1.

It will be helpful to illustrate a particular form of backshell. However, it will be appreciated that the type of backshell can vary. For instance, some backshells are of the 180° type where a "straight through" passage of the conductor ends is desired. On the other hand, it is frequently necessary to have a 90° or 45° bend and in the pictured instance provision is made for a 90° bend. Hence, the backshell labeled 24 is composed of two sections 26 and 28 held together by a plurality of screws 30 which appear only in dotted outline in FIG. 1. It will be appreciated that the first-mentioned section 26 is the section that is coupled directly to the electrical connector 12, whereas the second-mentioned section 28 contains the sealing means forming the subject matter of the instant invention.

Describing now the construction of the backshell section 28, it will be perceived that this part of the backshell 24 has an internal groove 32 which contains a conventional O-ring 34. A second groove is formed externally in the backshell section 28, the external groove having been indicated by the reference numeral 36.

Rotatably connected to the backshell section 28 is a coupling sleeve 38 having an internal groove 40 adjacent the end providing the rotatable connection to the backshell 24. The rotatable connection is accomplished by means of a resilient split ring 42 which can be compressed inwardly into the groove 36 on the backshell section 28 and allowed to spring outwardly so that it occupies portions of both of the grooves 36, 40. Hence, the coupling sleeve 38 is precluded from being detached longitudinally with respect to the backshell section 28, yet it can be readily rotated with respect to said backshell section.

The coupling sleeve 38 is formed with internal threads 44 at the end thereof opposite the end having the internal groove 40 contained therein. Intermediate the ends of the coupling sleeve 38 is an internal shoulder 46 which is formed by counterboring the coupling sleeve, the counterbore being identified by the reference numeral 48. Intermediate the ends of the coupling sleeve 38 are internal threads at 50.

Forming an important part of the invention is a gland or resilient ring 52 of elastomeric material, the particular configuration being quite important to a practicing of the invention. In this regard, it will be seen that the ring 52 is formed with a groove 54 having outwardly diverging or flaring side walls 56 which have an arcuate or curved shape imparted thereto, the base portion 58 of the groove being generally semi-circular. Additionally, it will be seen that the ring 52 has a cylindrical bore 60 extending therethrough and is formed with parallel sides or faces 62 and 64, the side 62 abutting the shoulder 46 of the coupling sleeve 38. It will be observed that the bottom of the groove 54 is located approximately ⅓ the distance from the cylindrical bore 60 with respect to the distance from the cylindrical bore 60 to the outer periphery of the ring. However, a practical range of such locations falls between ¼ and ½ the distance, the aforementioned ⅓ being the preferred relation.

From the description up to this point it should be readily understood that the resilient ring 52 is located or contained in a gland chamber, the volume of which can be varied. To accomplish the volumetric variation, a washer 68 has been placed against the side 64 of the resilient ring 52. Confronting the washer 68 is a backup nut 70 having external threads 72 which are engageable with the internal threads 44 on the coupling sleeve 38. By means of hexagonal flats 74 at the opposite end of the backup nut 70, the nut can be advanced directly against the washer 68 and indirectly against the resilient ring 52 through the intermediary of the washer 68 to cause a desired amount of distortion to occur in the ring 52. Some idea of the amount of distortion can be seen in FIG. 2 where the smaller size cable 16a has been illustrated as evidence of the utility of the present invention. If desired, intermediate external thread 76 can be formed on the backup nut 70.

Attention is directed at this time to a braid-clamping sleeve 80 which has external threads 82 engageable with the internal threads 50 of the coupling sleeve 38. The braid-clamping sleeve 80 is counterbored at 84 so as to provide a shoulder 86 which abuts the end of the plastic jacket or casing 22 on the cable 16. The braid-clamping sleeve 80 as its name denotes, functions to clamp the braid 20. In furtherance of this end, the braid-clamping sleeve 80 is formed with a frusto-conical surface 88 having a triangular groove 90 formed therein into which a section of the braid 20 is pressed in a manner soon to be described.

Additionally, the braid-clamping sleeve 80 has internal threads 92 at the end opposite thereof from the external threads 82. Intermediate the threads 82 and 92 are angularly spaced teeth forming an external spline section 94 on the braid-clamping sleeve 80. This external spline section 94 interfits with an internal spline section 96 formed on the backshell 24, more specifically the section 28 in the depicted instance. The spline sections 94 and 96 are completely mated or engaged when an angled or inclined shoulder 98 formed internally on the backshell section 28 engages or abuts a similarly inclined shoulder 100 formed externally on the braid-clamping sleeve 80. The respective shoulders 98 and 100 are longitudinally located on the members 28 and 80 such that when these shoulders are engaged the threaded end of the braid-clamping sleeve 80 will be co-planar with the shoulder 46.

A braid-clamping nut 102 has a frusto-conical surface 104 which complements the surface 88 on the braid-clamping sleeve 80. Still further, a rib 106 having a triangularly configured cross-section projects into the groove 90 so as to deflect or bend the braid 20 somewhat and thereby more securely anchor the braid 20 between the clamping sleeve 80 and the clamping nut 102. By means of external threads 108 on the braid-clamping nut 102, this nut can be advanced so as to cause a firm engagement of its surface 104 against the exposed braid 20 of the cable 16.

Having presented the foregoing description, the manner in which my combined cable clamp and sealing means is used should be readily understood. It will be appreciated, though, that the shoulder 46 within the coupling sleeve 38 provides a seat for the side 62 of the resilient ring 52. As previously discussed, the inclined shoulders 90 and 100 when engaging each other, allow the threaded end of the braid-clamping sleeve 80 to reside in the same plane as the shoulder 46. Hence, the threaded end and shoulder form a combined surface against which the side 62 of the resilient ring 52 is pressed when the backup nut 70 is advanced inwardly so as to force the washer 68 against the opposite side 64 of the resilient ring.

In this way, the bight portion, identified as 52a, serves as a fulcrum and there is a rocking action that transpires as the backup nut 70 is tightened. This causes the bight portion 52a to bend with the consequence that the elastomeric ring 52 in the vicinity of the bight portion 52a is forced inwardly into tight clamping engagement with the jacket or casing 22 of the cable 16 (or 16a as seen in FIG. 2). At the same time, the leg portions, which will be designated as 52b and 52c, tend to be forced outwardly, particularly the leg portion 52c because it is fulcrummed or rocked with respect to the bight portion 52a. In this way, the resilient sealing ring 52 is forced against the counterbore 48 and to provide a good seal in the vicinity of the tip of the leg portion 52c and the outer edge of the washer 68. Of course, the compression of the resilient ring 52 by the forcing of the side 62 thereof against the shoulder 46 and the threaded end of the braid-clamping sleeve 80 prevents liquid migration from occurring in this region. The inward forcing of some of the elastomeric material against the casing or jacket 22 functions to prevent entrance of any moisture or gas in this vicinity. Hence, it is virtually impossible for any gas or moisture to pass beyond the sealing ring 52 and an excellent hermetic seal in all possible locations adjacent the entrance to the backshell 24 is provided. At the same time, the requisite clamping or anchoring of the cable 16 itself is derived.

In the case of FIG. 2 where the cable 16a is of smaller size than the cable 16, the groove 54 becomes narrower; that is, the leg portion 52c is moved closer to the leg portion 52b. This results in the bight portion 52a being bent to a greater degree and thus forced inwardly against the jacket 22 of the cable 16a. It should be evident that cables of different diameters in this way can be accommodated without having to select a ring 52 of smaller size. Also, the hardware which includes the various parts 24, 38, 70, 80 and 102 need not be changed just because a cable of different size is to be accommodated.

I claim:

1. In combination with a backshell through which end portions of conductors from an electric cable extend, said backshell having one end adapted to be attached to an electrical connector provided with contacts to which said conductors are electrically connected, a coupling sleeve rotatably connected at one end to the other end of said backshell, said coupling sleeve having internal threads adjacent its other end and interior shoulder means intermediate its ends, a resilient ring disposed between said internal threads and said shoulder means, said resilient ring having an outwardly facing groove therein, the walls of said groove diverging outwardly so that said groove becomes progressively wider toward the periphery of the ring, and a backup nut provided with external threads received in said internal threads so that said nut can be advanced toward said shoulder means to compress said ring thereagainst and concomitantly reduce the width of said groove with a portion of said ring being forced inwardly to clamp said cable.

2. The combination of claim 1 in which said walls are curved.

3. The combination of claim 2 in which said ring has a generally cylindrical bore and parallel flat sides, one of said flat sides confronting said shoulder means.

4. The combination of claim 3 in which the distance from said cylindrical bore to the base of said groove is from ¼ to ½ of the distance from said cylindrical bore to the periphery of said ring.

5. The combination of claim 3 in which the distance from said cylindrical bore to the base of said groove is approximately ⅛ of the distance from said cylindrical bore to the periphery of said ring.

6. The combination of claim 1 including a washer member intermediate said resilient ring and said backup nut, whereby advancement of said backup nut bears against said washer member to compress said ring.

7. In combination with a backshell through which end portions of conductors from an electric cable extend, said backshell having one end adapted to be attached to an electrical connector provided with contacts to which said conductors are electrically connected, a coupling sleeve rotatably connected at one end to the other end of said backshell, said coupling sleeve having internal threads adjacent its other end and interior shoulder means intermediate its ends, a resilient ring disposed between said internal threads and said shoulder means, said resilient ring having an outwardly facing groove therein, a backup nut provided with external threads received in said internal threads so that said nut can be advanced toward said shoulder means to compress said ring thereagainst and concomitantly reduce the width of said groove with a portion of said ring being forced inwardly to clamp said cable, said coupling sleeve being formed with additional internal threads between said one end thereof and said shoulder means, a braid-clamping sleeve having external threads at one end received in said 8. The combination of claim 12 in which said backshell is provided with an internally splined section adjacent its said other end and said braid-clamping sleeve has an externally splined section intermediate its ends, rotation 9. The combination of claim 8 in which said backshell is formed with an inclined internal shoulder located toward its said one end from its splined section and in which said braid-clamping sleeve is formed with an inclined external shoulder located between said other end thereof and its splined section, said inclined shoulders serving as limits when engaging each other so as to position said one end of said braid-clamping sleeve in the same general plane as said shoulder means.

10. In combination with a backshell through which end portions of conductors from an electric cable extend, said backshell having one end adapted to be attached to an electrical connector provided with contacts to which said conductors are electrically connected, coupling sleeve means on said backshell having internal threads adjacent one end and interior shoulder means, a resilient ring disposed between said internal threads and said shoulder means, said resilient ring having an outwardly facing groove therein forming leg portions to either side thereof, said leg portions having oppositely directed parallel faces, and backup nut means provided with external threads received in said internal threads and having a parallel face acting on one parallel face of said ring so that said nut means can be advanced toward said shoulder means to compress said ring thereagainst and concomitantly reduce the width of said groove with a portion of said ring being forced inwardly to clamp said cable and the outer ends of said legs being forced against said coupling sleeve means.

* * * * *

UNITED STATES PATENT OFFICE
CERTIFICATE OF CORRECTION

Patent No. 3,675,184            Dated July 4, 1972

Inventor(s) Ottomar H. Vetter

It is certified that error appears in the above-identified patent and that said Letters Patent are hereby corrected as shown below:

Column 3, line 33, "thread" should be --threads--. Column 4, line 3, "90" should be --98--. Column 5, line 25, after "said" insert --additional threads, said braid-clamping sleeve having a generally frusto-conical surface for engaging the braid of the cable and said braid-clamping sleeve having internal threads extending from said frusto-conical surface to the other end thereof, and a braid-clamping nut threadedly engaged in said last-mentioned threads and having a surface portion complementing said frusto-conical portion so as to clamp said braid therebetween.--. Column 6, line 1, after "rotation" insert --of said coupling sleeve in one direction causing said splined sections to be moved into an interfitting relation.--.

Signed and sealed this 19th day of December 1972.

(SEAL)
Attest:

EDWARD M. FLETCHER, JR.            ROBERT GOTTSCHALK
Attesting Officer                     Commissioner of Patents